(12) United States Patent
Domegan et al.

(10) Patent No.: US 6,981,273 B1
(45) Date of Patent: Dec. 27, 2005

(54) SYSTEM, METHOD AND CHANNEL LINE-UP PROCESSOR FOR LOCALIZING AN ELECTRONIC PROGRAM GUIDE SCHEDULE

(75) Inventors: Patrick A. Domegan, Toronto (CA); William L. Marriott, Markham (CA); Andrei Stebakov, Scarborough (CA)

(73) Assignee: Sonic Solutions, Santa Clara, CA (US)

( * ) Notice: Subject to any disclaimer, the term of this patent is extended or adjusted under 35 U.S.C. 154(b) by 1002 days.

(21) Appl. No.: 09/792,312

(22) Filed: Feb. 21, 2001

(51) Int. Cl.[7] .......................... G06F 3/00; G06F 13/00; H04N 5/445
(52) U.S. Cl. .................................. 725/39; 725/50
(58) Field of Search .................... 725/35, 38, 39–55, 725/25–31

(56) References Cited

U.S. PATENT DOCUMENTS

| | | | | |
|---|---|---|---|---|
| 5,699,125 | A * | 12/1997 | Rzeszewski et al. | 725/50 |
| 6,020,880 | A * | 2/2000 | Naimpally | 725/48 |
| 6,212,680 | B1 * | 4/2001 | Tsinberg et al. | 725/39 |
| 6,401,242 | B1 * | 6/2002 | Eyer et al. | 725/35 |
| 6,721,018 | B1 * | 4/2004 | Shintani et al. | 348/731 |

\* cited by examiner

*Primary Examiner*—John Miller
*Assistant Examiner*—Johnny Ma

(74) *Attorney, Agent, or Firm*—Martine Penilla & Gencarella, LLP

(57) ABSTRACT

A system for localizing an EPG program schedule, including an EPG service provider station including a database of channels and corresponding EPG program schedule information, a database manager identifying a plurality of channel line-ups potentially receivable at a viewing location, a transmitter, and a receiver, a multimedia viewer situated at the viewing location including an automatic channel line-up identifier identifying a first line-up of television channels receivable at the viewing location, a channel line-up processor at the viewing location calculating a channel line-up from among the plurality of channel line-ups that substantially matches the first line-up, a receiver receiving from the EPG service provider station the plurality of channel line-ups, and a transmitter transmitting to the EPG service provider station the identifier of the channel line-up calculated by the channel line-up processor, and a network connection linking the multimedia viewer to the EPG service provider, wherein the EPG service provider station transmitter transmits to the multimedia viewer the plurality of channel line-ups and also transmits to the multimedia viewer EPG program schedule information localized to the viewing location and based on the identifier of the channel line-up calculated by the channel line-up processor, and wherein the EPG service provider station receiver receives from the multimedia viewer the identifier of the calculated channel line-up, and wherein the multimedia viewer receiver also receives from the EPG service provider station the EPG program schedule information.

84 Claims, 16 Drawing Sheets

SYSTEM, METHOD AND CHANNEL LINE-UP PROCESSOR FOR LOCALIZING AN ELECTRONIC PROGRAM GUIDE SCHEDULE

FIELD OF INVENTION

The present invention relates to a television electronic program guide ("EPG") and, in particular, to a method, system and channel line-up processor for "localizing" an EPG to direct only relevant schedule information to a viewer.

BACKGROUND OF INVENTION

EPG systems that provide subscribing television viewers with on-screen program schedule information in a convenient format are well known. Interactive EPGs operate under viewer control permitting the browsing and selecting on-screen of schedule information. Such EPGs may also permit the ordering of pay-per-view programming and perform other useful operations on demand. Some EPG systems co-operate with recording equipment such as VCRs to instruct the recording of programs. An example of an EPG system is described in U.S. Pat. No. 5,592,551 by Lett, et al., entitled "Method And Apparatus For Providing Interactive Electronic Programming Guide".

Typical EPGs function by delivering program schedule information, and sometimes applications and/or systems software, electronically to equipment such as a PC or set-top-box co-located with a viewer's television. The electronic delivery is usually by way of broadcast, cable, direct satellite, wide area network or some other suitable form of transmission. The delivered guide is stored in a memory in the equipment for viewing and reviewing and is periodically updated, whether on demand or automatically. The equipment further comprises a microprocessor and program instruction to provide EPG functionality. The microprocessor is operative with the program to display the schedule on a display device (such as a monitor or the television screen) and to respond to viewer instructions received via an input device such as an IR controller, keyboard or the like.

Viewers desire program schedule information that corresponds to the choice of programming available to them in a particular locale. Viewers may receive television program content from a variety of service providers such as cable or satellite operators and via local broadcasters over-the-air. Of course, content may also be delivered digitally over a network. As such, the programming available to one viewer may differ from that available to another. However programming guides are typically aggregated in a central location from a plurality of data sources for reasons of efficiency. These guides must then be distributed in a manner that is useful to a particular viewer, i.e. tailoring the schedule to the viewer's general programming availability.

It is known to transmit pertinent program schedules to subscribing viewers based upon an identification of the viewer's service provider and/or general geographic location. For example, different solutions are provided in U.S. Pat. No. 5,760,821 of Ellis et al., entitled "Electronic Program Guide Schedule Localization System and Method" (hereinafter "Ellis") and U.S. Pat. No. 5,988,078 of Levine entitled "Method and Apparatus for Receiving Customized Television Programming Information by Transmitting Geographic Location to a Service Provider Through a Wide Area Network" (hereinafter "Levine"). Ellis teaches a system to filter program schedule information at the subscriber end, saving only program data pertinent to a particular subscriber as selected according to a subscriber's service provider and geographic location. Levine teaches a method and system to distribute only pertinent data to a subscriber over a wide-area network. The data is filtered at the EPG service provider end upon receipt of the subscriber's geographic location (e.g. ZIP code) and, if necessary, service provider.

In contrast, it is particularly difficult to identify the specific programming available to a subscribing viewer who receives television programming from over-the-air broadcast sources. A primary service provider (e.g. a cable operator) cannot be used as a convenient programming identifier for the subscribing viewer. In such a case, a geographic indicator such as a postal or ZIP code is a better indicator of the EPG subscriber's available channel line-up (i.e. set of channels receivable by a subscriber). However, due to the relative size of some geographic regions identified by postal code or the geographic and other anomalies in such regions that may affect a subscriber's reception, subscribers having the same postal code may not receive the same programming over-the-air.

In many regions of the United Kingdom, where cable and satellite providers do not have relatively large market penetration and broadcast is the primary source of programming, it is known that viewers in the same postal code region often have very different channel line-ups. Reference is now made to FIG. 1, which is a schematic illustration of two viewers in the same general geographic location that receive different channel line-ups. As shown in FIG. 1, a first viewer at location 58 with a TV antenna 48 receives a broadcast channel 34 (ITV) and a broadcast channel 40 (BBC3). A second viewer at location 60 with TV antenna 48 receives broadcast channel 34 (ITV) and a broadcast channel 48 (BBC3). The first viewer does not receive channel 48 and the second viewer does not receive channel 40. The channel line-up of the first viewer is 34 and 40, and the channel line-up of the second viewer is 34 and 48.

Thus a simple identifier of a geographic region cannot distinguish such EPG subscribing viewers.

Moreover it is costly to determine on an individual basis the line-up of specific over-the-air programming sources for each subscriber in a general geographic area to build a database. A manual survey of each subscriber or potential subscriber to determine programming source availability is impractical. A comprehensive database may be constructed and operated that co-ordinates a geographical position for each channel source. The geographical position of an EPG subscriber may then be compared with the database to determine a channel line-up of nearest channels. However, the construction of such a database, typically from GPS readings, is quite costly, and the operation thereof is slow.

It is advantageous to have a method and system for localizing an electronic program guide schedule particularly where viewers may not be conveniently grouped by service provider and/or general geographic location. An EPG provider may thus provide localized services from a central database economically.

SUMMARY OF THE INVENTION

Throughout the present specification the terms "line-up" and "channel line-up" refer to a list of program channels available to a specific viewer.

There is thus provided in accordance with a preferred embodiment of the present invention a system and method for localizing an EPG program schedule. In accordance with an embodiment of the invention, the system comprises an EPG service provider station; a multimedia viewer; and a network connection linking the multimedia viewer to the EPG service provider. The EPG service provider station comprises a database of channels and corresponding EPG program schedule information; a database manager identifying a plurality of channel line-ups potentially receivable at a viewing location; a transmitter; and a receiver. The multimedia viewer situated at the viewing location comprises an automatic channel line-up identifier identifying a first line-up of television channels receivable at the viewing location; a channel line-up processor at the viewing location calculating a channel line-up from among the plurality of channel line-ups that substantially matches the first line-up; a receiver receiving from the EPG service provider station the plurality of channel line-ups; and a transmitter transmitting to the EPG service provider station the identifier of the channel line-up calculated by the channel line-up processor. In the system, the EPG service provider station transmitter transmits to the multimedia viewer the plurality of channel line-ups and also transmits to the multimedia viewer the EPG program schedule information localized to the viewing location and based on the identifier of the channel line-up calculated by the channel line-up processor. Further the EPG service provider station receiver receives from the multimedia viewer the identifier of the calculated channel line-up, and the multimedia viewer receiver also receives from the EPG service provider station the EPG program schedule information.

Preferably the automatic channel line-up identifier comprises a television antenna receiving broadcast television signals at the viewing location; a television tuner adjusting channels until a channel having a significant level of channel reception at the viewing location is detected; and an autotune processor automatically stepping through a range of channels and using the television tuner to detect channels having significant levels of reception at the viewing location.

The multimedia viewer may further comprise a user interface enabling a user to input an indicator of a particular geographical location such that the plurality of channel line-ups identified by the database manager are specific to the particular geographical location. The multimedia viewer may also further comprise a user interface enabling a user to input an indicator of a particular type of service such that the plurality of channel line-ups identified by the database manager are specific to the particular type of service. The particular type of service may be a cable program service, a satellite broadcast service or a television broadcast service. The user interface may also enable a user to input an indicator of a particular service provider for the particular type of service such that the plurality of channel line-ups identified by the database manager are future specific to the particular service provider.

According to an aspect of the invention, the channel line-up processor finds a channel line-up, from among the plurality of channel line-ups, that has a maximal number of channels matching the channels in the first line-up. The substantial match may be based upon levels of reception for the channels in the first line-up.

According to another embodiment of the invention there is provided a further system for localizing an EPG program schedule. The system comprises a multimedia viewer situated at a viewing location; an EPG service provider station; and a network connection linking the multimedia viewer to the EPG service provider. In accordance with this system, the multimedia viewer transmitter transmits the first line-up to the EPG service provider station, and the multimedia viewer receiver receives the EPG program schedule information from the EPG service provider station. The multimedia viewer comprises an automatic channel line-up identifier identifying a first line-up of television channels receivable at the viewing location; a transmitter; and a receiver. The EPG service provider station comprises a database of channels and corresponding EPG program schedule information; a database manager identifying a plurality of channel line-ups potentially receivable at the viewing location; a channel line-up processor for the EPG service provider calculating a channel line-up from among the plurality of channel line-ups that substantially matches the first line-up; a receiver receiving the first line-up from the viewing location; and a transmitter transmitting to the viewer location the EPG program schedule information localized to the viewing location and based on the channel line-up calculated by the channel line-up processor.

Preferably, in the present system, the automatic channel line-up identifier comprises a television antenna receiving broadcast television signals at the viewing location; a television tuner adjusting channels until a channel having a significant level of channel reception at the viewing location is detected; and an autotune processor automatically stepping through a range of channels and using the television tuner to detect channels having significant levels of reception at the viewing location.

The multimedia viewer may further comprise a user interface enabling a user to input an indicator of a particular geographical location. In such a case, the multimedia viewer transmitter transmits the indicator of the particular geographical location to the EPG service provider station, the EPG service provider station receiver receives the indicator of the particular geographical location, and the plurality of channel line-ups identified by the database manager are specific to the particular geographical location. Further the multimedia viewer may also comprise a user interface enabling a user to input an indicator of a particular type of service. In such a case the multimedia viewer transmitter transmits the indicator of the particular type of service to the EPG service provider station, the EPG service provider station receiver receives the indicator of the particular type of service, and the plurality of channel line-ups identified by the database manager are specific to the particular type of service. The particular type of service may be a cable program service, a satellite broadcast service or a television broadcast service. The user interface may also enable a user to input an indicator of a particular service provider for the particular type of service. In this further case, the multimedia viewer transmitter transmits the indicator of the particular service provider to the EPG service provider station, the EPG service provider station receiver receives the indicator of the particular service provider, and the plurality of channel line-ups identified by the database manager are specific to the particular service provider.

Preferably, the channel line-up processor finds a channel line-up from among the plurality of channel line-ups that has a maximal number of channels matching the channels in the first line-up. The substantial match may be based upon levels of reception for the channels in the first line-up.

In accordance with a further embodiment of the invention there is provided another system for localizing an EPG program schedule. The system comprises an automatic channel line-up identifier identifying a first line-up of television channels receivable at a viewing location; a network connection connecting to an EPG service provider having a database of channels and corresponding EPG program schedule information; a receiver receiving from the EPG service provider a plurality of channel line-ups potentially receivable at the viewing location, each channel line-up including an identifier, and also receiving from the EPG service provider the EPG program schedule information localized to the viewing location; a channel line-up processor calculating a channel line-up from among the plurality of channel line-ups that substantially matches the first line-up; and a transmitter transmitting the identifier of the calculated channel line-up to the EPG service provider. In accordance with the system, the EPG program schedule information localized to the viewing location is based on the identifier of the channel line-up calculated by the channel line-up processor.

Preferably the automatic channel line-up identifier comprises a television antenna receiving broadcast television signals at the viewing location; a television tuner adjusting channels until a channel having a significant level of channel reception at the viewing location is detected; and an auto-tune processor automatically stepping through a range of channels and using the television tuner to detect channels having significant levels of reception at the viewing location.

In accordance with another embodiment of the invention, there is provided a further system for localizing an EPG program schedule. The system comprises a database of channels and corresponding EPG program schedule information; a network connection connecting to a viewing location; a receiver receiving from the viewer location a first line-up of television channels; a database manager identifying a plurality of channel line-ups potentially receivable at the viewing location; a channel line-up processor calculating a channel line-up from among the plurality of channel line-ups that substantially matches the first line-up; and a transmitter transmitting to the viewer location the EPG program schedule information localized to the viewing location and based on the channel line-up calculated by the channel line-up processor.

In accordance with this system, the receiver also receives an identifier of a particular geographical location and the plurality of channel line-ups are specific to the particular geographical location. The receiver may also receive an identifier of a particular type of service such that the plurality of channel line-ups are specific to the particular type of service. The particular type of service may be a cable program service, a satellite broadcast service or a television broadcast service.

The receiver may also receive an identifier of a particular service provider for the particular type of service and the plurality of channel line-ups are specific to the particular service provider.

Preferably, the channel line-up processor finds a channel line-up from among the plurality of channel line-ups that has a maximal number of channels matching the channels in the first line-up. The substantial match may based upon levels of reception for the channels in the first line-up.

In accordance with an aspect of the invention there is provided a method for localizing an EPG program schedule. The method comprises automatically identifying a first line-up of television channels receivable at a viewing location; establishing a connection linking the viewing location to an EPG service provider through a network, the EPG service provider having a database of channels and corresponding EPG program schedule information; identifying a plurality of channel line-ups potentially receivable at the viewing location; transmitting to the viewer location the plurality of channel line-ups, each channel line-up including an identifier; receiving from the EPG service provider the plurality of channel line-ups; calculating a channel line-up from among the plurality of channel line-ups that substantially matches the first line-up; transmitting to the EPG server provider the identifier of the calculated channel line-up; receiving from the viewer location the identifier of the calculated channel line-up; transmitting to the viewer location the EPG program schedule information localized to the viewing location, based on the identifier of the calculated channel line-up; and receiving from the EPG service provider the EPG program schedule information.

Preferably, the step of automatically identifying comprises receiving broadcast television signals at the viewing location; and automatically stepping through a range of channels and detecting channels having significant levels of reception at the viewing location. The plurality of channel line-ups may be specific to a particular geographical location or to a particular type of service. The particular type of service may be a cable program service, a satellite broadcast service or a television broadcast service.

In a further alternative the plurality of channel line-ups are specific to a particular service provider for the particular type of service.

Preferably, the step of calculating a channel line-up comprises finding a channel line-up from among the plurality of channel line-ups that has a maximal number of channels matching the channels in the first line-up. The substantial match may be based upon levels of reception for the channels in the first line-up.

In accordance with an embodiment of the invention there is provided a further method for localizing an EPG program schedule. The method according to this embodiment comprises automatically identifying a first line-up of television channels receivable at a viewing location; establishing a connection linking the viewing location to an EPG service provider through a network, the EPG service provider having a database of channels and corresponding EPG program schedule information; transmitting to the EPG service provider the first line-up; receiving from the viewer location the first line-up; identifying a plurality of channel line-ups potentially receivable at the viewing location; calculating a channel line-up from among the plurality of channel line-ups that substantially matches the first line-up; transmitting to the viewer location the EPG program schedule information localized to the viewing location, based on the calculated channel line-up; and receiving from the EPG service provider the EPG program schedule information.

There is further provided a method for localizing an EPG program schedule according to another aspect of the invention. This method comprises automatically identifying a first line-up of television channels receivable at a viewing location; establishing a connection linking the viewing location to an EPG service provider through a network, the EPG service provider having a database of channels and corresponding EPG program schedule information; receiving from the EPG service provider a plurality of channel line-ups potentially receivable at the viewing location, each channel line-up including an identifier; calculating a channel line-up from among the plurality of channel line-ups that substantially matches the first line-up; transmitting the identifier of the calculated channel line-up to the EPG service provide; and receiving from the EPG service provider the EPG program schedule information localized to the viewing location, based on the identifier of the calculated channel line-up.

The invention further relates to a method for localizing an EPG program schedule comprising receiving from a viewer location a first line-up of television channels; identifying a plurality of channel line-ups potentially receivable at the viewing location; calculating a channel line-up from among the plurality of channel line-ups that substantially matches the first line-up; and transmitting EPG program schedule information localized to the viewing location, based on the calculated channel line-up.

In accordance with another aspect of the invention there is provided a channel line-up processor. The channel line-up processor comprises a input interface receiving as input a detected line-up of television channels and a plurality of channel line-ups; a channel matcher calculating a channel line-up from among the plurality of channel line-ups that substantially matches the channels in the detected line-up; and an output interface delivering as output the channel line-up calculated by the channel matcher. The substantial match may be based upon the number of channels in a channel line-up matching the channels in the detected line-up or upon levels of reception for the channels in the first line-up.

In accordance with a final aspect of the invention, there is provided a method for processing channel line-ups. This method comprises receiving as input a detected line-up of television channels and a plurality of channel line-ups; calculating a channel line-up from among the plurality of channel line-ups that substantially matches the channels in the detected line-up; and delivering as output the channel line-up calculated by the channel matcher. The substantial match may be based upon the number of channels in a channel line-up matching the channels in the detected line-up or upon levels of reception for the channels in the first line-up.

BRIEF DESCRIPTION OF THE DRAWINGS

Further features and advantages of the present invention will become apparent from the following detailed description taken in combination with the appended drawings, in which.

It will be noted that throughout the appended drawings, like features are identified by like reference numerals.

DETAILED DESCRIPTION OF INVENTION

The system and method of the present invention may be implemented on any suitable EPG platform having storage means for storing program schedule information; processor means connected to the storage means for executing a software program in accordance with the invention's functions; display means controllable by the processor means for displaying the schedule information; and input means operable with the processor means for inputting user selections and information as may be necessary. The software program of the present invention may be stored in a separate storage means or in the same storage means used to store the program schedule information.

Figure 1:
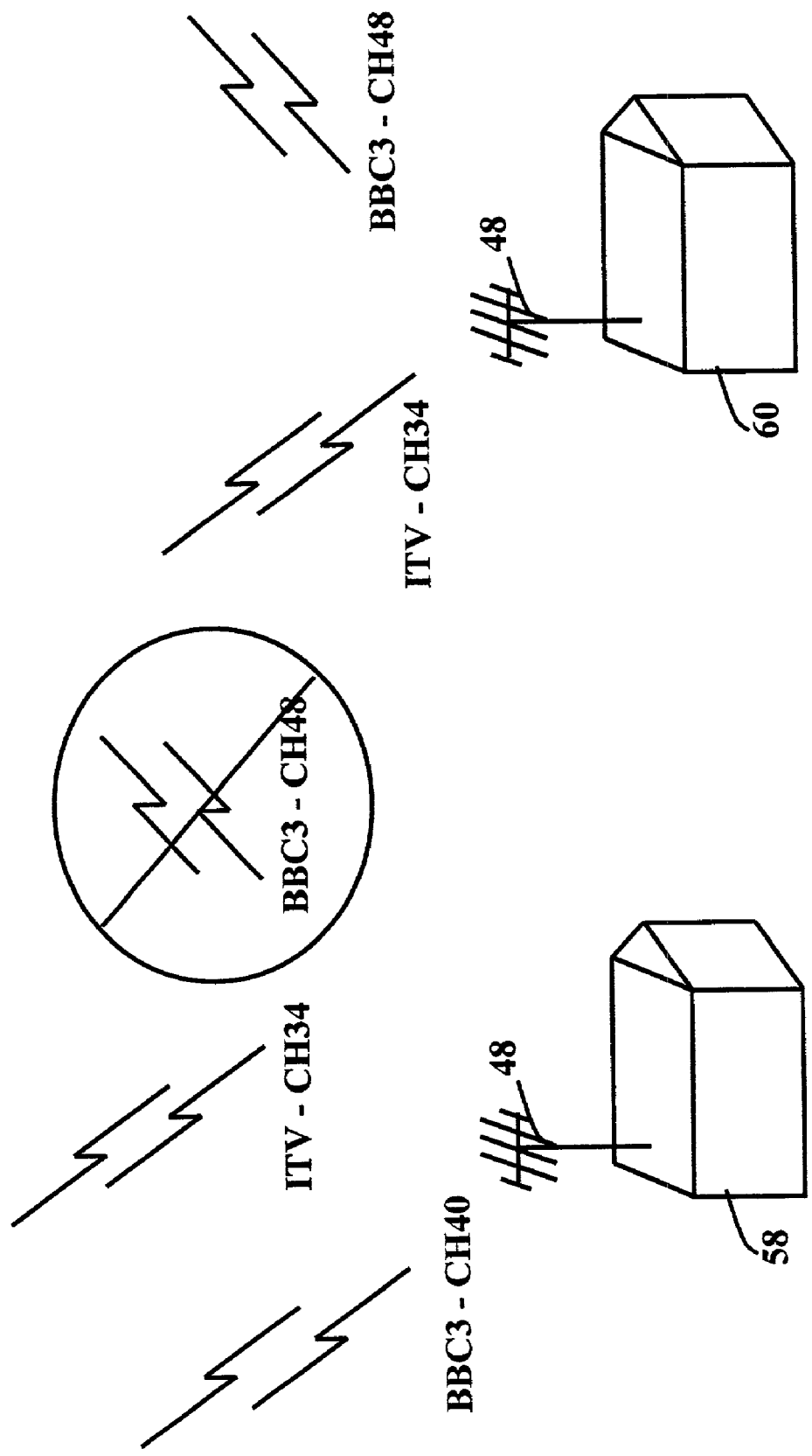
FIG. 1 (prior art) illustrates schematically two viewers in the same general geographic location that receive different channel line-ups.
Figure 2:
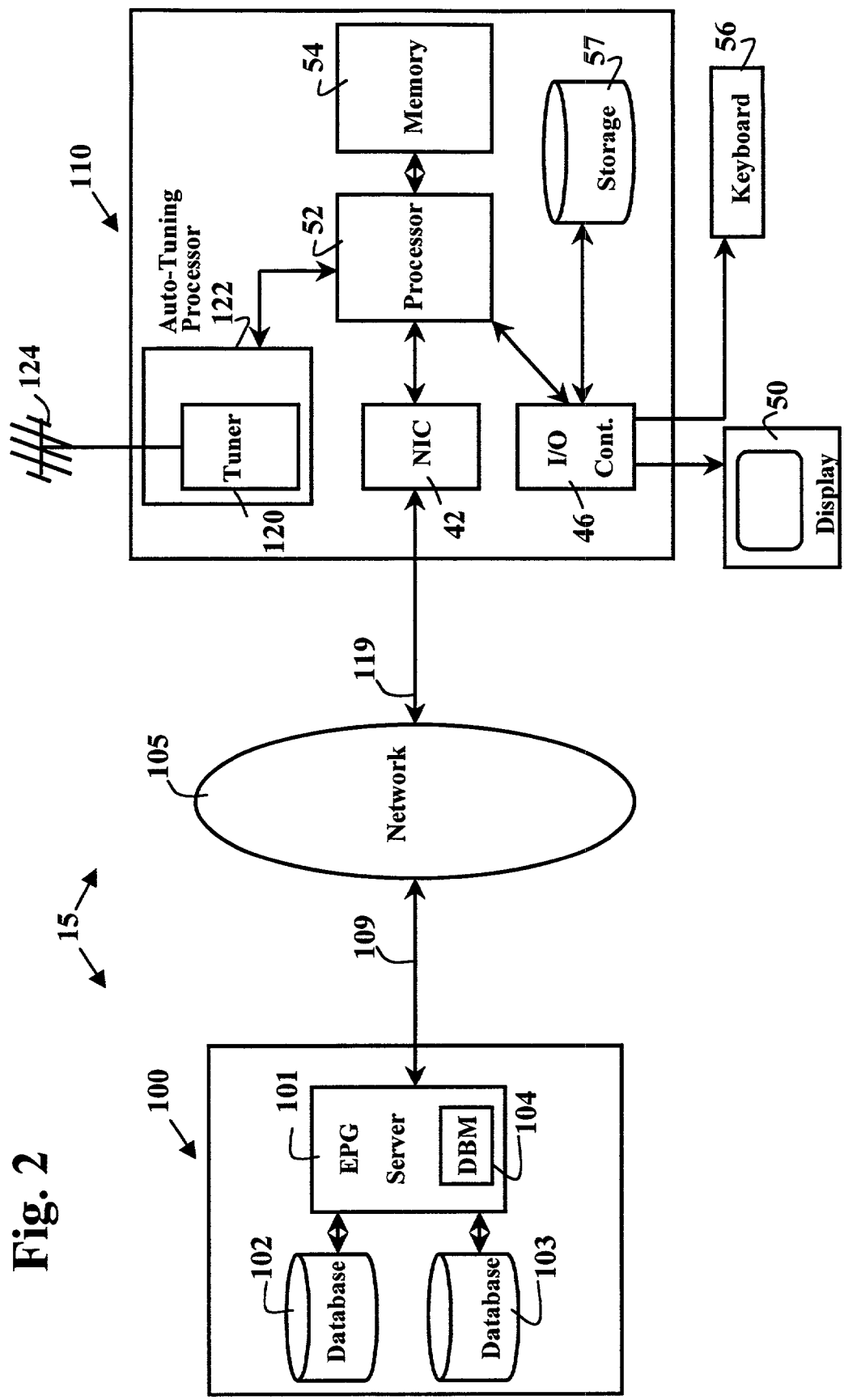
FIG. 2 illustrates a schematic diagram of an EPG program schedule distribution network to a personal computer and television viewing system including a TV receiver implementing a preferred embodiment of the present invention.

A preferred suitable EPG platform 15 for implementing the present invention is illustrated in FIG. 2 comprising a Personal Computer 110 (PC) configured as a multimedia viewer at a viewing location. The term PC is used broadly incorporating workstations, portable computers, minicomputers, and other suitable computing devices. PC 110 comprises a microprocessor 52; run-time memory 54 connected to microprocessor 52; and long term storage means 57, for example a hard disk drive, for storing program schedule information and software program instructions and an operating system. PC 110 further comprises an I/O controller 46 for connecting a video display device 50 such as a display monitor or television set, and an input device 56 such as a keyboard, to microprocessor 52. Included is an automatic channel line-up identifier 122 for identifying a first line-up of television channels receivable at the viewing location. Automatic channel line-up identifier 122 is connected to microprocessor 52 and comprises a television tuner card 120 connected to reception means 124 such as an antenna for receiving and tuning television signals. Antenna 48 is useful for receiving over-the-air broadcast signals. Alternatively, cable or satellite signals may also be received via appropriate reception means.

A network interface card 42 acting as a transmitter and receiver is connected to microprocessor 52 for facilitating communications to a wide area network 105, such as the Internet, via a network interface connection 119. Connection 119 may comprise a variety of connection means such as a telephone subscriber loop, co-axial cable, LAN and other suitable communication media, as is well understood in the art.

Persons skilled in the art will appreciate that other appropriate hardware configurations may be suitable for the present invention. Personal computer 110 is conventional but is provided with a particular software program to implement the present invention. The structure, sequence and design of this software program is well within the skill of a programmer using the functional description of the program as provided herein.

As the present invention is primarily concerned with program schedule information distribution and not with general EPG functionality, the description of the invention does not discuss the particular details of EPG display and primary EPG functionality (e.g. schedule display, review and program selection) well understood to those skilled in the art.

In a preferred embodiment of the present invention, EPG program schedule information is transmitted to multimedia viewer 110 via wide-area network 105 from a central EPG service provider station 100 comprising a server 101 connected via network connection 109 to network 105. Network connection 109 preferably comprises any of a variety of high-speed network connection means as is well understood. Server 101 hosts a database manager 104 for controlling access to a plurality of channel line-ups potentially receivable at the viewing location, and EPG program schedule information for such line-ups stored in one or more databases 102 and 103. Server 101 is configured to receive requests for channel line-ups from PC 110 and to transmit a plurality of line-ups and localized EPG program schedule information for one of those line-ups to PC 110 as described further.

The present invention may be used with other modes of transmission with minor modifications as will be apparent to those skilled in the art. Additionally, more than one server 101 may be used for load balancing as will become apparent.

EPG program schedule information may be localized for the cable service, digital satellite service or over-the-air broadcast service available to an EPG subscriber. Through operation of the software program, this information may be localized through an initialization routine or wizard in which the subscriber keys in data identifying the subscriber's geographic location and cable or satellite program service provider as may be necessary. FIGS. 3A–3G are screen captures of an EPG initialization wizard for data entry and for instruction to localize a program schedule transmission in accordance with a preferred embodiment of the present invention.

Figure 3A:
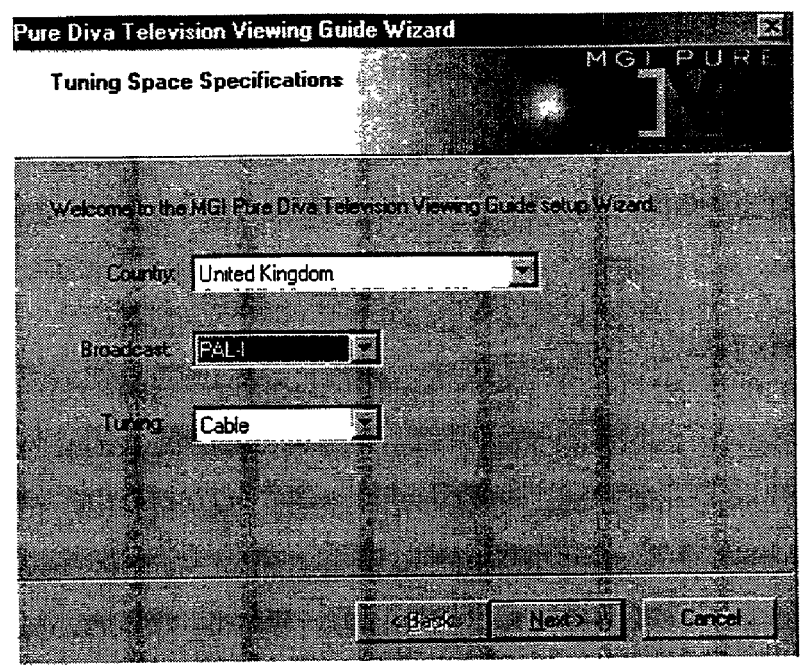
FIGS. 3A–3G illustrate screen captures of an EPG wizard initialization data entry and instruction interface in accordance with a preferred embodiment of the present invention.

To begin localizing EPG program schedule information on PC 110 at a viewing location, a viewer preferably initiates wizard software stored in memory 54 or storage 57 via microprocessor 52. After initialization, the wizard prompts the viewer to input the viewer's country, broadcast protocol and service tuning space (e.g. cable, satellite, antenna) via keyboard 56 or other suitable input device (not shown). FIG. 3A shows a screen displayable on display means 50 for requesting input. Preferably the fields will be pre-populated with appropriate choices. As an example, the "Broadcast" field may automatically be pre-populated with appropriate selections after a country is selected.

Figure 3B:
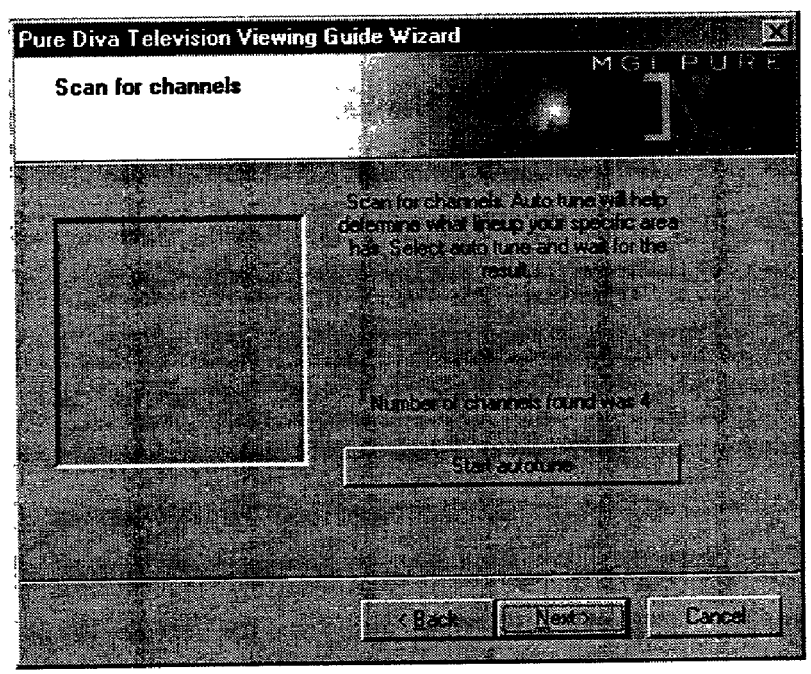

Following entry of this basic location and service type data, the wizard instructs automatic channel line-up identifier 122 to identify a first line-up of television channels receivable at the viewing location as illustrated in FIG. 3B. Under the direction of auto-tuning processor 122, tuner 120 automatically steps through a range of channels to detect the first line-up. As in this preferred embodiment, if the auto-tune processor is configured to operate in different areas where television signal formats may differ (e.g. between PAL or NTSC), auto-tune processor 122 may use country data to configure tuner 120 to recognize the appropriate television signal format. Television antenna 124 connected to tuner 120 attenuates television broadcast signals for reception at the viewing location. Tuner 120 adjusts the signals received by antenna 124 until a channel having a significant level of reception is detected.

Figure 3C:
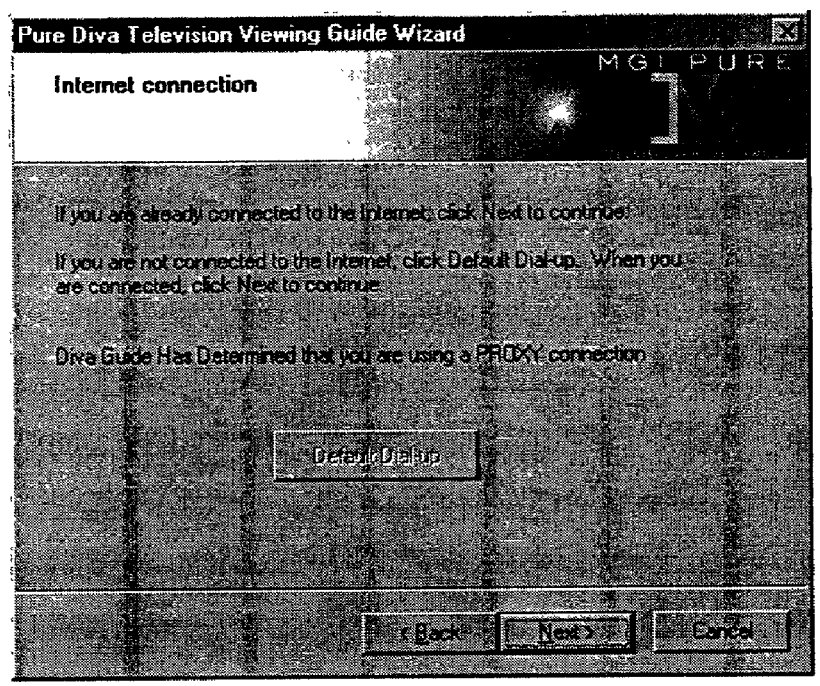
Figure 3D:
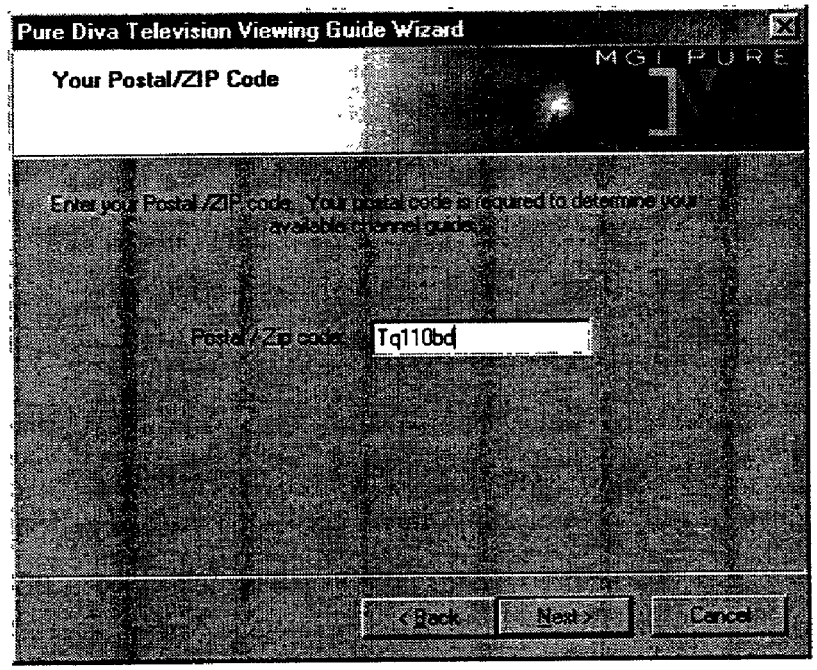

Following detection of a first line-up, a network connection between PC 110 and server 101 is then established over network 105, as shown in FIG. 3C. Once a connection is established, server 101 is queried to determine if an EPG program schedule is available for the viewer's country. If the server indicates that a country match is not available, the wizard notifies the viewer and terminates. If an EPG is available within the desired country, the wizard requests a further identification of the subscriber's locale, for example, by inputting a postal code or ZIP code as shown in FIG. 3D. Alternate general indicators of geographic location may be used, for example a telephone area code and exchange.

If the viewer indicated Cable or other service as the mode of tuning, the viewer may be queried to select an appropriate service provider from a list of service providers that may be downloaded from server 101 (not shown). In this way, the viewer may indicate a line-up number associated with the provider that identifies program schedule information for downloading.

However, if the subscriber indicated Antenna as the mode of tuning, then in accordance with a preferred embodiment of the present invention, the wizard requests server 101 to identify a set of channel line-ups for the particular local geographic region identified by the subscriber's postal code. Each line-up typically includes a set of channel numbers for television channels potentially receivable at the viewing location and a line-up identifier as a reference shorthand for the line-up. Of course it is understood that a channel number is a convenient reference for the actual signal frequency for the channel. As such a line-up may comprise a list of signal frequencies rather than a list of channel numbers or other identifiers. For example the set of channel line-ups may appear as in Table 1:

TABLE 1

| Line-up ID | Set of Channels |
|---|---|
| A19874 | 44, 48, 50, 52 |
| A19875 | 24, 44, 48, 50 |
| A19887 | 07, 44, 48, 50 |

Server 101 transmits the plurality of channel line-ups received via database manager 104 from its databases 102 and 103 to the viewing location over network 105. Upon receipt of the plurality of channel line-ups, the wizard calculates a channel line-up from the plurality of channel line-ups that substantially matches the first line-up automatically detected at discussed above. For example, the wizard may perform a search of the plurality of channel line-ups to find a channel-line up that has a maximal number of channels matching the channels in the first line-up. Further, the wizard may make use of the levels of reception for the channels of the first line-up when determining the substantial match. Signals below a threshold level of reception may be ignored for match purposes.

Figure 3E:
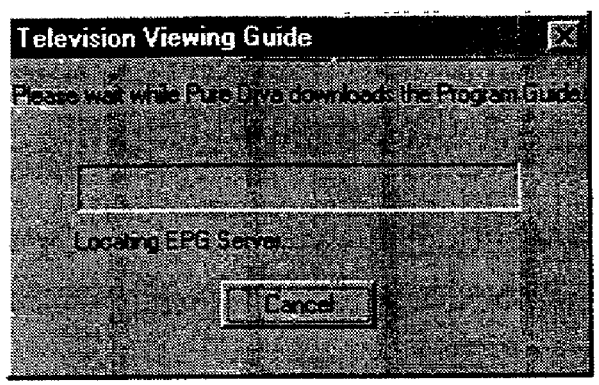

Thereafter, following identification of a line-up for downloading, the wizard transmits the identifier to server 101 with a request for the transmission of the appropriate EPG program schedule. Server 101 then transmits to the viewing location over network 105 the EPG program schedule information for the identified line-up as illustrated in FIG. 3E. The EPG program schedule information is received and then may be optionally stored in long-term storage means 57.

Figure 3F:
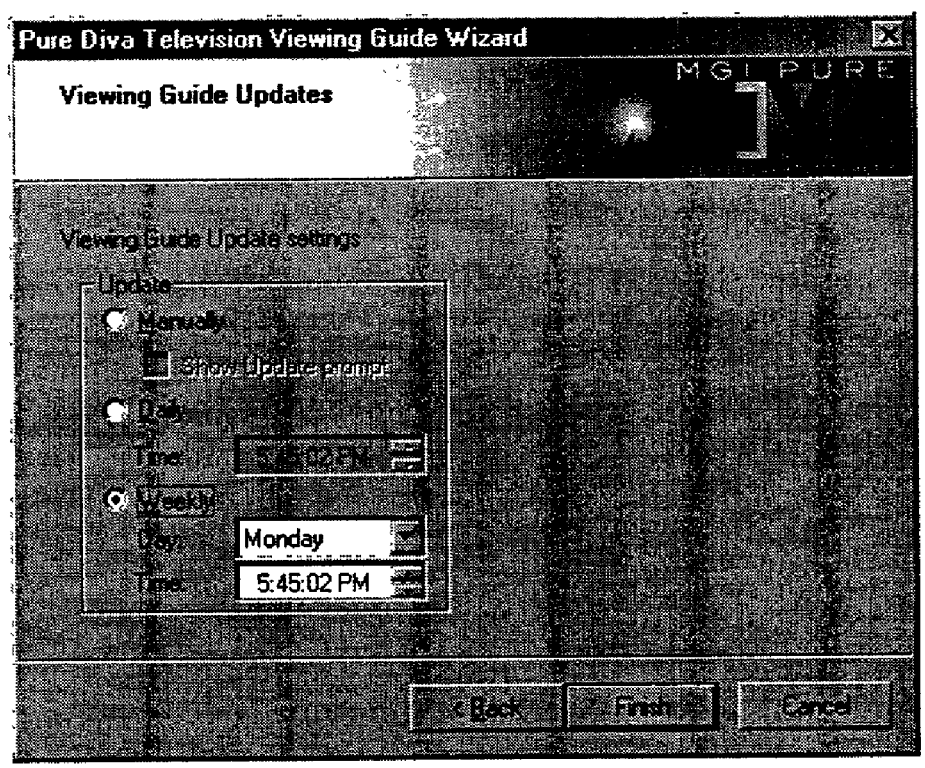
Figure 3G:
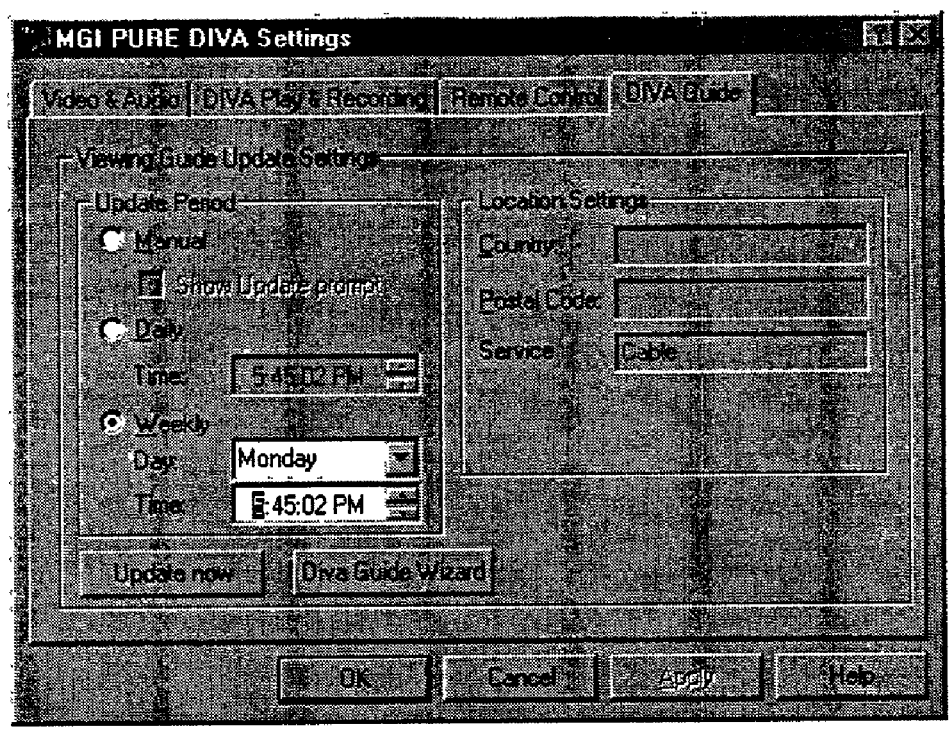

FIG. 3F of the wizard provides an illustration of a user interface to facilitate updates to the downloaded EPG program schedule information permitting updates on-demand (Manually) or periodically (e.g. Daily or Weekly). Subsequent initiation of an EPG download and/or re-configuration may be made via a user interface as illustrated in FIG. 3G. As is well understood to persons in the art, the wizard may be configured to automatically download updates of EPG program schedule information from server 101, for the identified channel line-up.

The present invention is not directed to any specific protocol of communications between server 101 and client PC 110. For example, in a preferred embodiment, the download of the EPG is via an FTP (file transfer protocol) client and the EPG schedule is downloaded in a compressed format to save bandwidth, all as understood in the art.

More than one server 101 may be employed for transmitting the EPG data. For example a first server may be employed to use the subscriber's line-up to further identify another one of one or more other servers on which the actual program guide for the line-up may be obtained.

While it is preferred that an automatic tuning of television broadcast signals be employed to identify the channels received by the subscriber, a manual input of the channels may be performed.

Through the method and system thus described for identifying a channel line-up via a best match of known line-ups to a measured over-the-air line-up, the present invention may be used, with minor modifications, to identify a measured cable or satellite line-up as well. This is particularly useful where there are significant differences between the possible line-ups provided to a subscriber.

Figure 4:
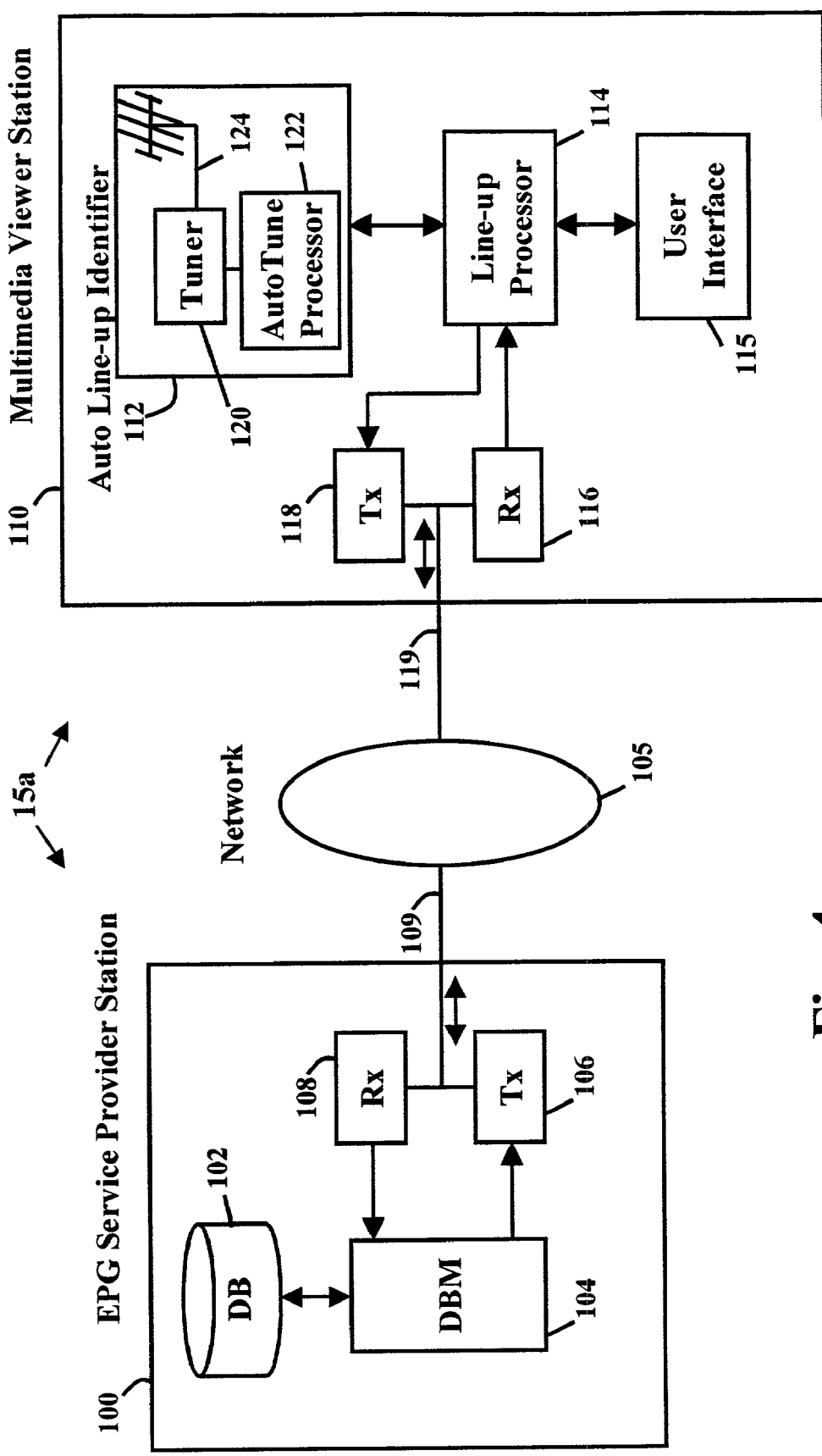
FIG. 4 illustrates an exemplary system for localizing an EPG program schedule in accordance with a preferred embodiment of the present invention.

FIG. 4 illustrates a further and exemplary embodiment of the invention in block diagram form. There is shown a system 15a for localizing an EPG program schedule comprising an EPG service provider station 100, a multimedia viewer station 110 and a network 105 connecting multimedia viewer station 110 via communication line 119 and EPG service provider station 100 via line 109 for communication. EPG service provider station 100 comprises a database 102, a database manager (DBM) 104 for managing database 102. Further an EPG receiver 108 and an EPG transmitter 106 connect DBM 104 to line 109 for two-way network communication to provide a localized EPG program schedule to multimedia viewer 110. As discussed in relation to the preferred embodiment of FIG. 2 and as set out in more detail below, DBM 104 identifies and provides a plurality of channel line-ups potentially receivable at multimedia viewer station 110. EPG transmitter 106 transmits the plurality of channels to multimedia viewer station 110. Once a particular channel line-up is identified by multimedia viewer station 110 to EPG service provider station 100, DBM 104 further provides localized EPG schedule information to multimedia viewer station 110.

Multimedia viewer station 110 comprises an automatic channel line-up identifier 112, a receiver 116, a channel line-up processor 114 and a transmitter 118. Automatic channel line-up identifier 112 identifies a first channel line-up of channels receivable at a particular geographic viewing location where the multimedia viewer station 110 operates. Receiver 116 receives from EPG service provider station 100 a plurality of channel line-ups from which to calculate a best matching line-up. Channel line-up processor 114 calculates a channel line-up from among the plurality of channel line-ups provided by EPG service provider station 100 that substantially matches the first line-up. Transmitter 118 transmits to EPG service provider station 100 the identifier of the channel line-up calculated by channel line-up processor 114.

Automatic channel line-up identifier 112 comprises a television antenna 124 for receiving broadcast television signals at the viewing location; a tuner 120 for tuning such signals, adjusting channels until a channel having a significant level of channel reception at the viewing location is detected; and an autotune processor 122 for automatically stepping through a range of channels and using the tuner 120 to detect channels having a significant level of reception. Automatic channel line-up identifier 112 provides detected channel line-up information to line-up processor 114 including the detected channel number and, preferably, a respective level of reception for each channel.

Automatic channel line-up identifier 112 may be capable of receiving one or more of a variety of types of service such as cable program service, satellite broadcast service or over-the-air television broadcast service.

Multimedia viewer station 110 further comprises a user interface 115 enabling a user to input data specific to his environment. For example user interface 115 may be useful for inputting an indicator of a particular geographic location for multimedia viewer station 110. Preferably, user interface 115 may be used to input an indicator for identifying a particular type of service or, optionally, a particular service provider for the particular type of service in use at the multimedia viewer. The plurality of channel line-ups identified by DBM 104 may be specific to the user data input.

Figure 5A:
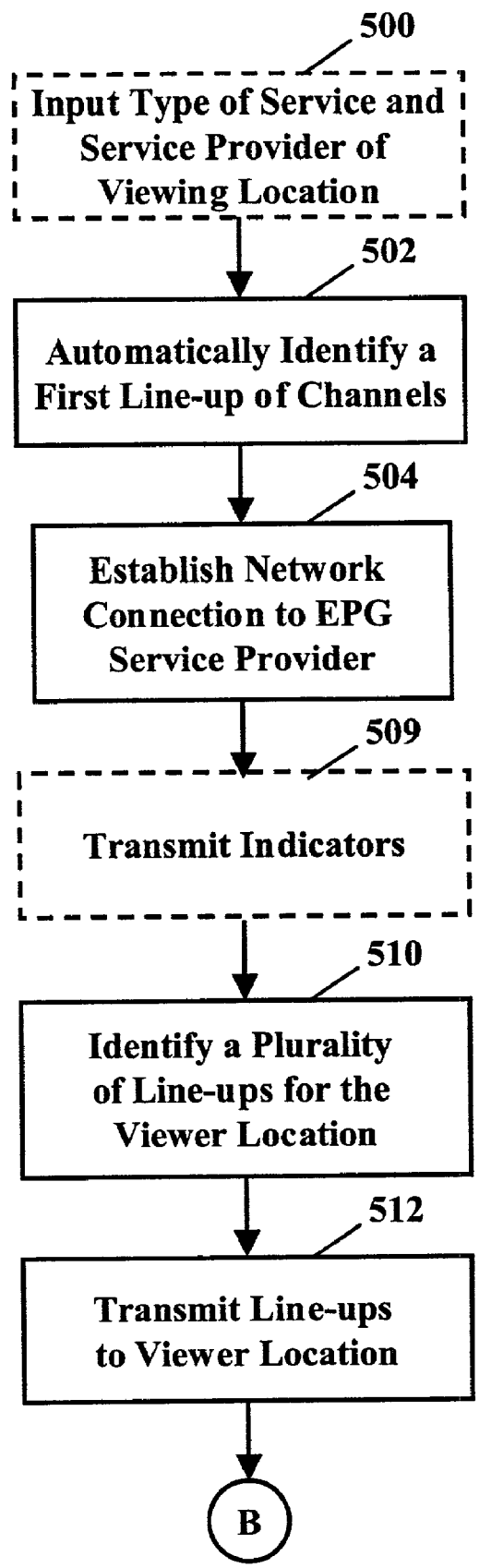
FIGS. 5A and 5B illustrate an exemplary process flow chart for a method of localizing an EPG program schedule in accordance with the exemplary embodiment of FIG. 4.
Figure 5B:
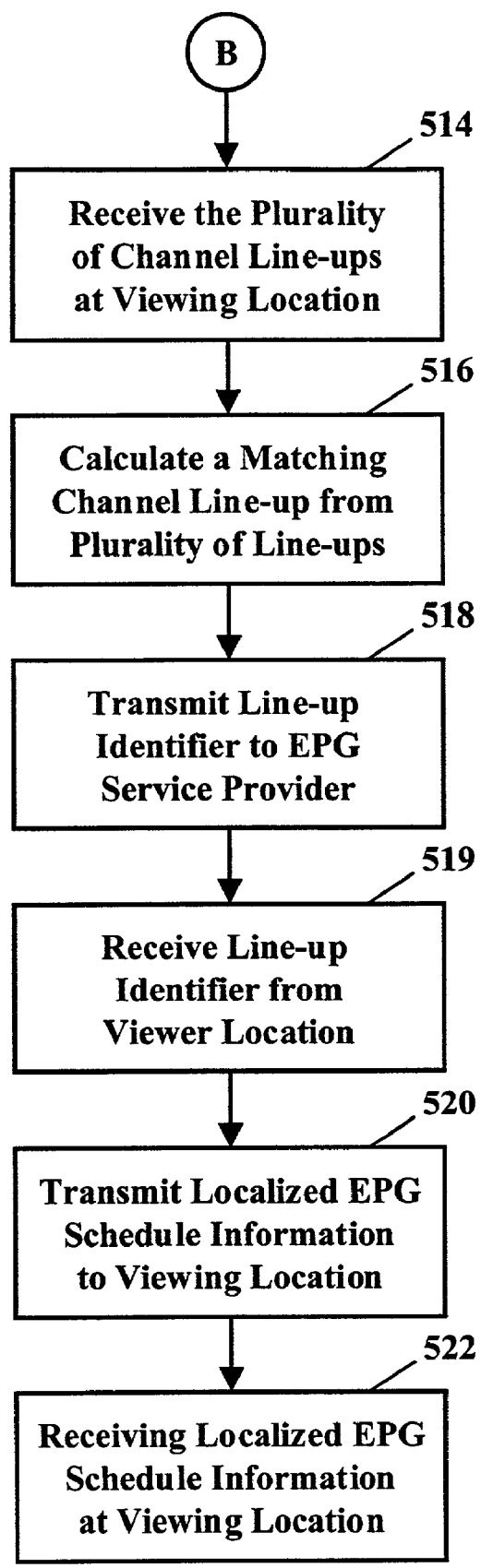

In operation, the exemplary system of FIG. 4 operates in a manner similar to the preferred embodiment of FIG. 2. FIGS. 5A and 5B illustrate an exemplary process flow chart for localizing an EPG program schedule information in accordance with the invention and the system of FIG. 4. Optionally, as indicated by dashed lines in FIG. 5A, after initialization, the user is prompted to input certain user data such as location, type of service (e.g. cable, satellite, antenna) and/or service provider at step 500 via user interface 115. System 15a may be configured to operate only with over-the-air broadcast service and thus not require service type and provider data. Moreover, system 15a may be configured for regional operation making the entering of geographic data superfluous. For example, different software versions providing the multimedia viewer station functionality may be distributed to different regions and the various versions may be pre-populated with a broad geographical indicator or be configured to communicate with a particular EPG service provider station 100 having regionalized database 102.

Following the optional entry of this basic location and service type data, automatic channel line-up identifier 112 operates to identify a first line-up of television channels receivable at the viewing location at step 502. As understood by persons skilled in the art of conventional autotune functionality (and not shown in FIG. 5A), under the direction of auto-tuning processor 122, tuner 120 automatically steps through a range of channels to detect the first line-up. Television antenna 124 connected to tuner 122 attenuates television broadcast signals for reception at the viewing location. Tuner 122 adjusts the signals received by antenna 124 until a channel having a significant level of channel reception is detected. The detected channel information is provided to line-up processor 114.

Following detection of a first line-up at step 502, a network connection between multimedia viewer station 110 and EPG service provider station 100 over network 105 is then established, as indicated at step 504. Once a connection is established, if multimedia viewer station 110 is configured to receive user input indicating geographic location, type of service or service provider, the indicator(s) may be transmitted to the EPG service provider station 100 at step 509.

At step 510, EPG service provider station 100 identifies a plurality of channel line-ups for multimedia viewer station 110. Each line-up typically includes a set of channel numbers for television channels potentially receivable at the viewing location and a line-up identifier as a reference shorthand for the line-up. For example the set of channel line-ups may appear as in Table 1 above. In co-operation with EPG receiver 108, DBM 104 retrieves the plurality of channel line-ups from DB 102, paring the plurality based on any user input indicators received. In co-operation with EPG transmitter 106, the plurality of channel line-ups retrieved by database manager 104 are transmitted to multimedia viewer location 110 over network 105 at step 512 of FIG. 5A.

With reference to FIG. 5B, upon receipt of the plurality of channel line-ups at step 514 by receiver 116, a channel line-up is calculated at step 516 by line-up processor 114 from the plurality of channel line-ups that substantially matches the first line-up automatically detected at step 502. For example, the line-up processor may perform a search of the plurality of channel line-ups to find a channel-line up that has a maximal number of channels matching the channels in the first line-up. It may resolve decisions between one line-up and another by considering the relative levels of reception for the channels in the first line-up, preferring a line-up from the plurality of line-ups received if the line-up has more channels having high relative levels of reception over other line-ups.

At step 518, following identification of the line-up for downloading, line-up processor 114 transmits to EPG service provider station 100 the identifier via multimedia transmitter 118. In response EPG service provider station 100 receives the identifier (step 519) and transmits via transmitter 106 to the viewing location the EPG program schedule information thus localized, as indicated at step 520. At step 522 receiver 116 receives the localized EPG program schedule information, for displaying to a viewer.

Figure 6:
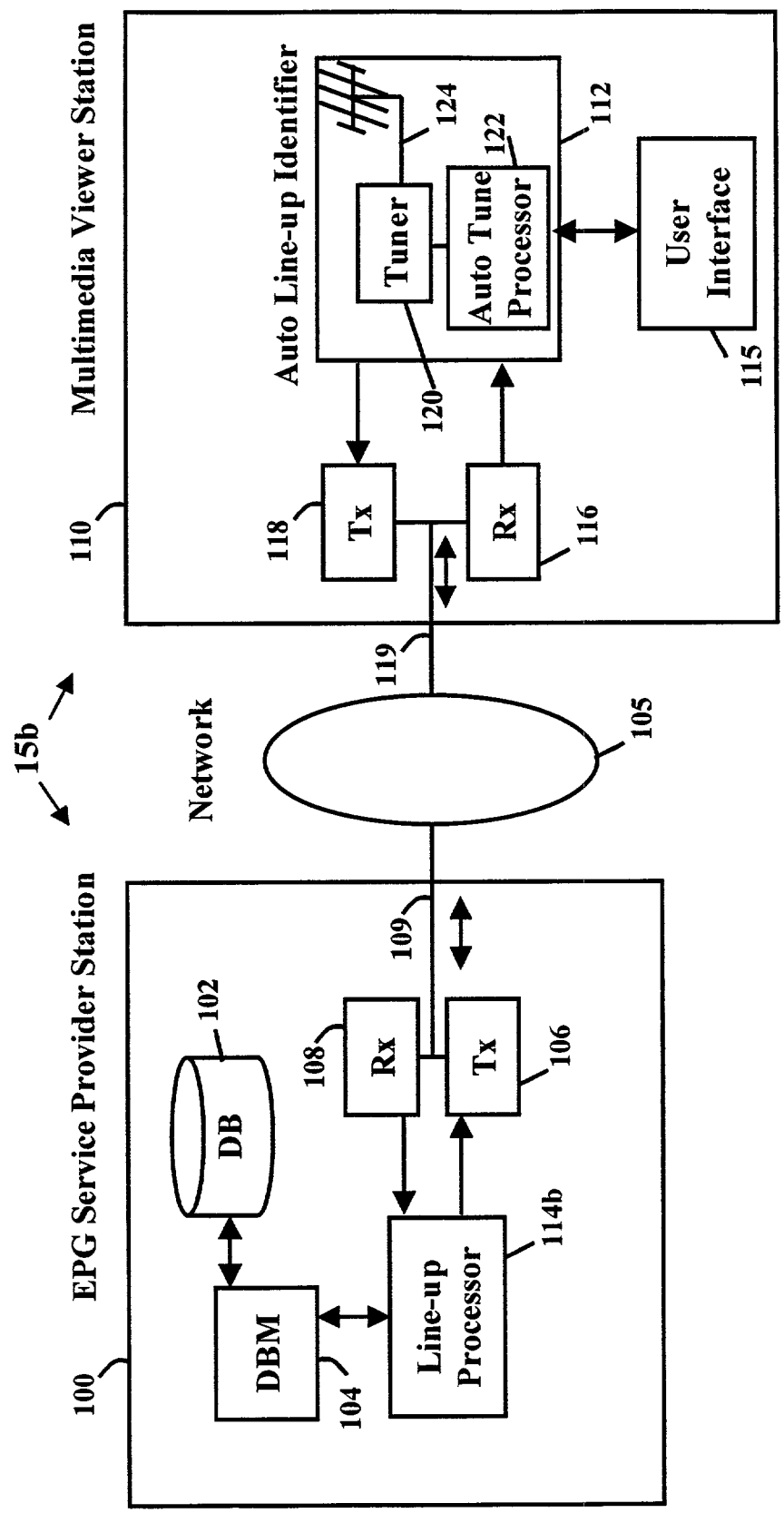
FIG. 6 illustrates a further exemplary system for localizing an EPG program schedule in accordance with an alternate embodiment of the invention.

It is not necessary to perform line-up processor functionality at multimedia viewer station 110. A channel line-up may be determined at EPG service provider station 100 from a first line-up identified by autotune line-up identifier 120 and transmitted from multimedia viewer station 110 via transmitter 116. FIG. 6 illustrates such a system 15b for localizing EPG program schedule information. System 15b differs from system 15a in that line-up processor 114b at EPG service provider station 100 replaces line-up processor 114 at multimedia viewer station 110. Line-up processor 114b communicates via EPG transmitter 106 and EPG receiver 108.

Figure 7A:
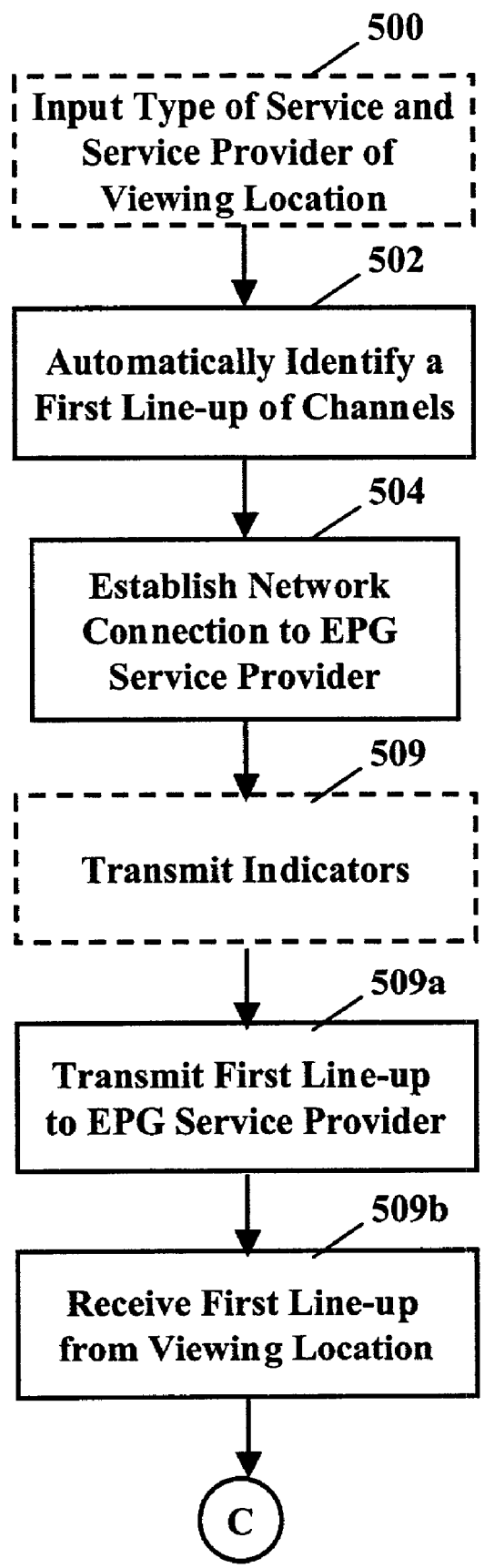
FIGS. 7A and 7B illustrate an exemplary process flow chart for a method of localizing an EPG program schedule in accordance with the exemplary embodiment of FIG. 6.
Figure 7B:
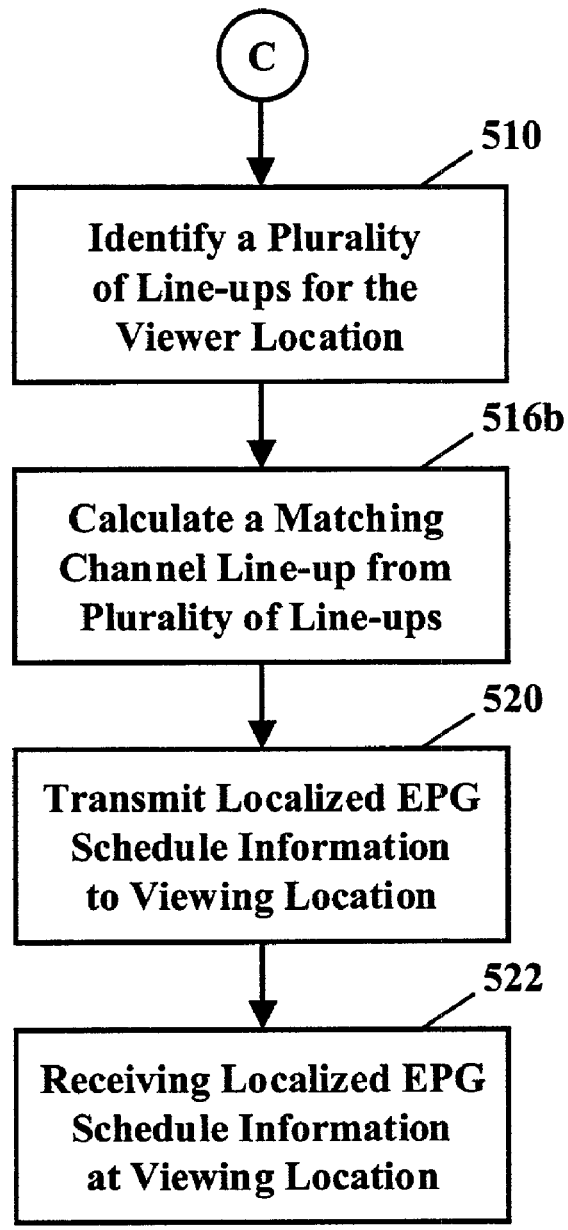

FIGS. 7A and 7B illustrate an exemplary process flow chart for the operation of system 15b. In addition to transmitting any user data indicators at optional step 509, multimedia viewer station 110 transmits via transmitter 118 the first channel line-up identified at step 502. (See step 509a.) The first line-up and any optional indicators are received by EPG station receiver 108 at step 509b. As shown at step 510 of FIG. 7B, line-up processor 114b identifies a plurality of channel line-ups, in co-operation with DBM 104 and DB 102, and at step 516b, line-up processor 114b calculates a channel line-up, from the plurality of line-ups, that substantially matches the first line-up. Following which, the localized EPG program schedule information is transmitted by EPG transmitter 106 to multimedia viewer station 110 and received by receiver 116 at steps 520 and 522.

Figure 8:
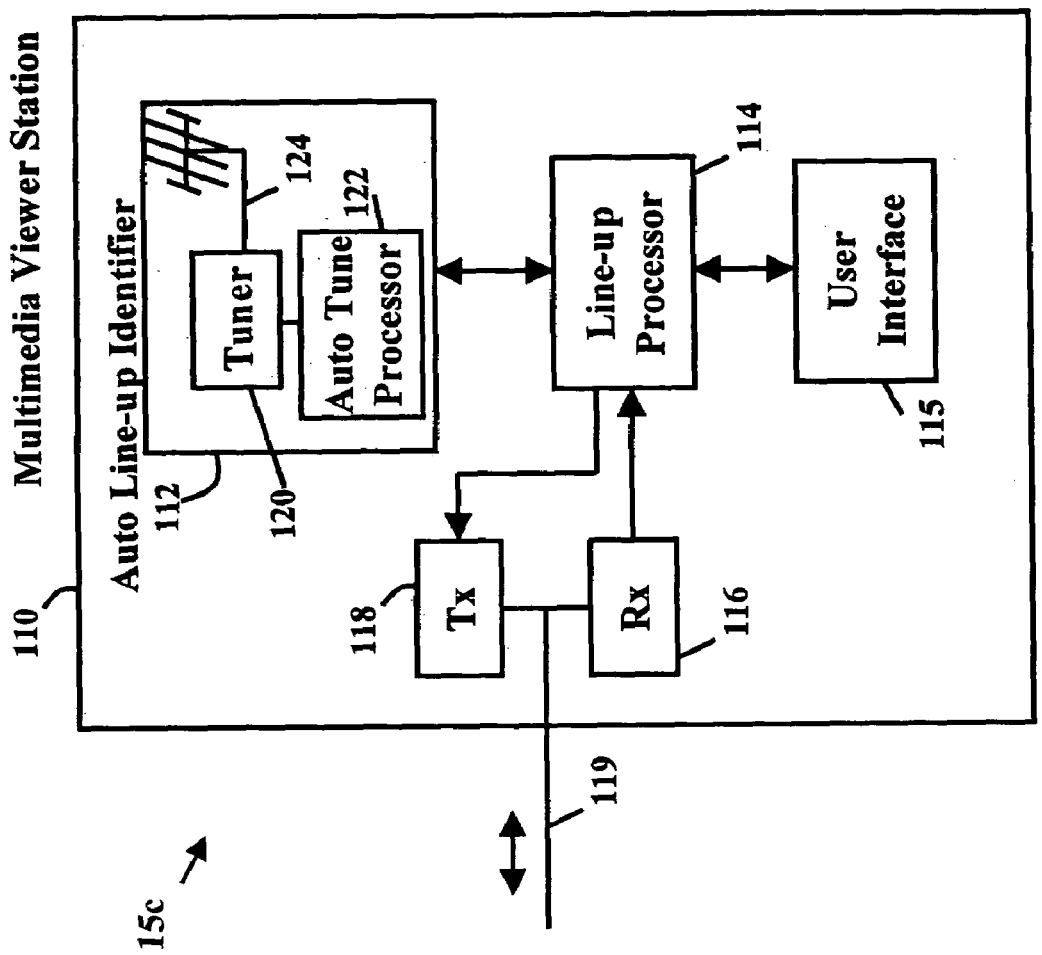
FIG. 8 illustrates another exemplary system (client-side) for localizing an EPG program schedule in accordance with a preferred embodiment of the present invention.
Figure 9:
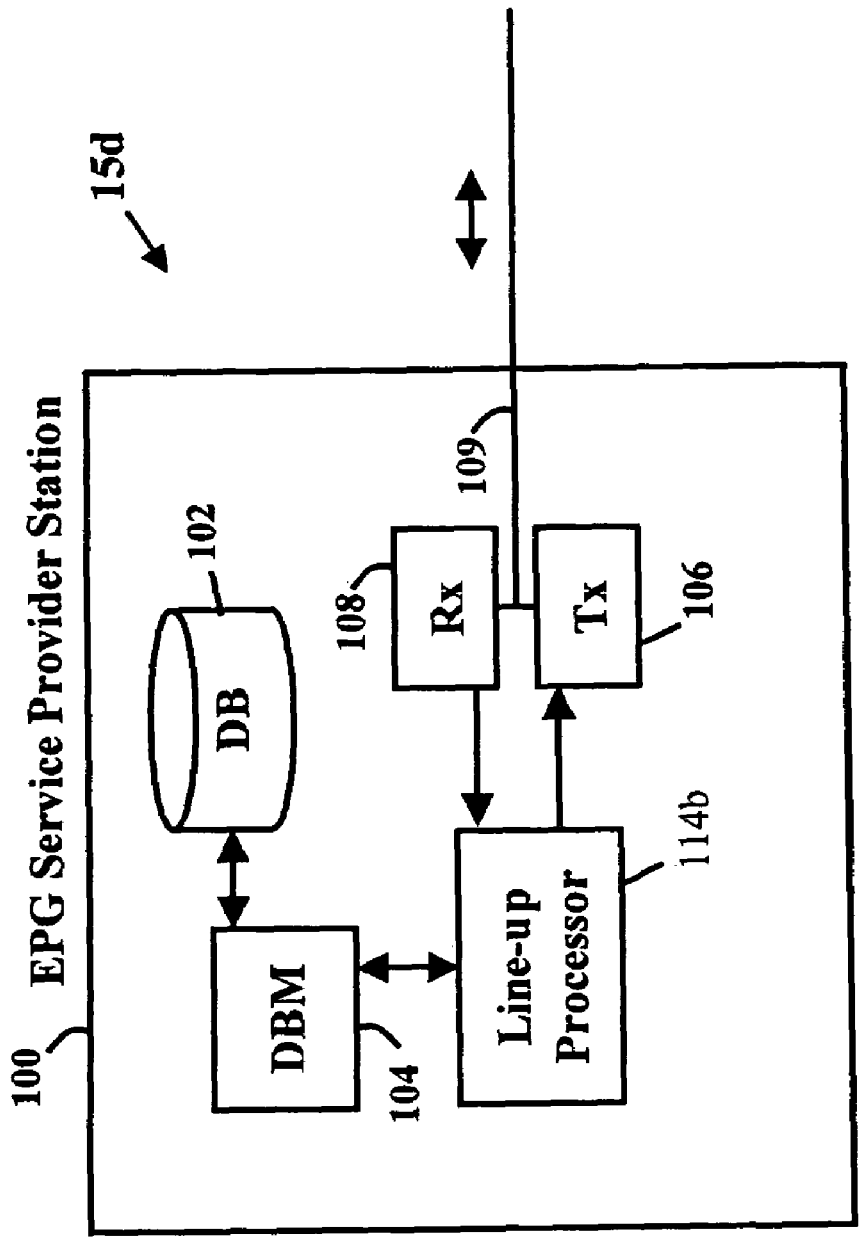
FIG. 9 illustrates another exemplary system (server-side) for localizing an EPG program schedule in accordance with an alternate embodiment of the present invention.

FIGS. 8 and 9 each illustrate separate exemplary systems 15c and 15d for localizing EPG program schedule information. Similar to multimedia viewer station 110 as depicted and described with reference to FIG. 4, system 15c of FIG. 8 relates to client-side multimedia viewer station 110 comprising an auto line-up identifier 112, a line-up processor 114, and transmit and receive units 118 and 116 respectively. The multimedia viewer station is connected via communication link 119 to a network (not shown) for communication with an EPG service provider station (not shown). The multimedia viewer station 110 further comprises a user interface 115. The operation of multimedia viewer station 110 is previously described.

Similar to EPG service provider station 100 as depicted and described with reference to FIG. 6, system 15d of FIG. 9 relates to a server-side EPG service provider station 100 comprising a line-up processor 114b, a database manager 104 and database 102, an EPG transmitter unit 106 and an EPG receiver unit 108. The EPG service provider station 100 is connected via communication link 109 to a network (not shown) for communication with a multimedia viewer station (not shown). The operation of EPG service provider station 100 is previously described.

Figure 10:
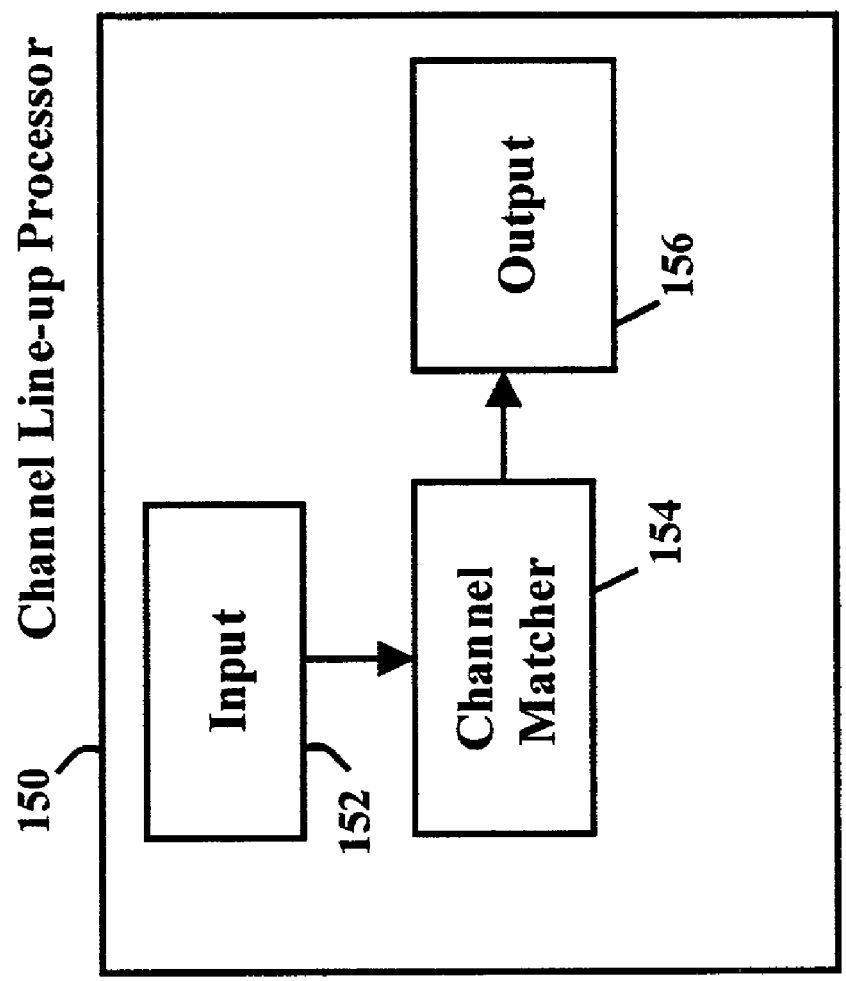
FIG. 10 illustrates a channel processor for processing channel line-ups for localizing an EPG program schedule in accordance with a preferred embodiment of the present invention.

FIG. 10 illustrates a channel line-up processor 150 for processing a channel line-up for localizing EPG program schedule information. Channel line-up processor 150 comprises an input interface 152 for receiving as input a detected line-up of television channels and a plurality of candidate line-ups. The detected line-up may be detected and provided by an automatic channel line-up identifier as previously described and the plurality of candidate line-ups may be provided from a database by a database manager as previously described. Channel line-up processor 150 further comprises a channel matcher 154 for calculating a channel line-up, from among the plurality of candidate line-ups, that substantially matches the channels in the detected line-up. The processor further comprises an output interface 156 for delivering as output the channel line-up calculated by channel matcher 154.

Channel matcher 154 may operate to determine a substantial match based upon the number of channels in the detected line-up that match the channels in a candidate line-up chosen from the plurality of candidate line-ups. The candidate line-up with the highest number of matches is selected. Alternatively, or possibly to resolve ties between candidate line-ups, channel matcher 154 may operate to determine the substantial match based upon levels of reception for the channels in the first line-up. Only those channels that meet a predetermined threshold level of reception may be considered so that weak signals that would likely result in poor reception and thus infrequent viewing are ignored in favour of stronger signals. The level of reception for each detected channel may be part of the detected channel line-up information provided via input 152.

Figure 11:
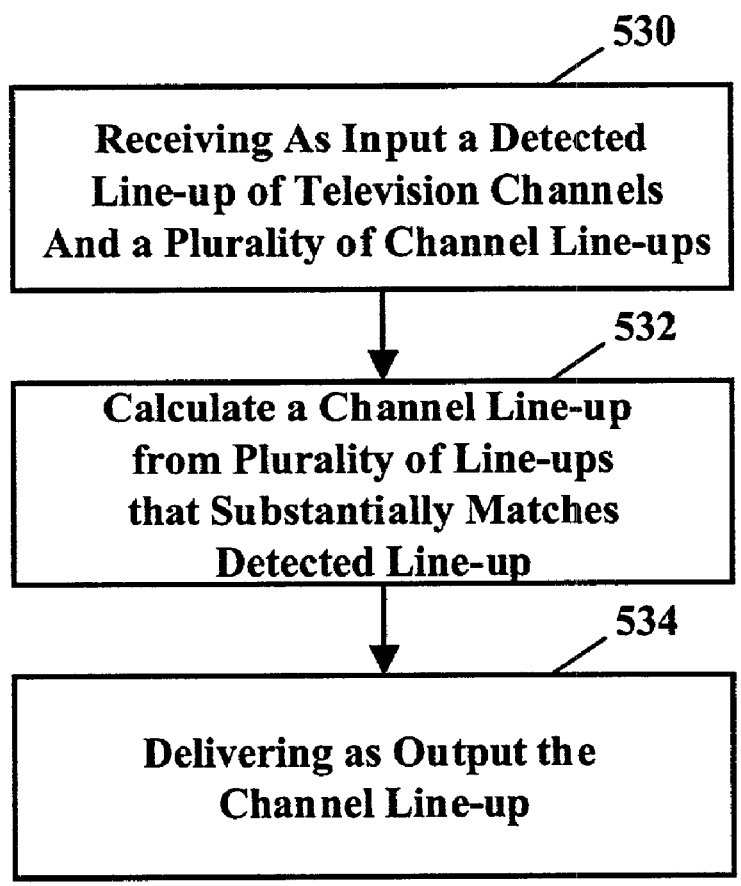
FIG. 11 illustrates an exemplary process flow chart for a method of processing channel line-ups in accordance with the exemplary embodiment of FIG. 10.

FIG. 11 illustrates a method for processing channel line-ups in accordance with exemplary channel line-up processor 150. As illustrated in step 530, channel line-up processor 150 receives as input via input 152 a detected line-up of television channels (for example, from an automatic channel line-up identifier not shown) and a plurality of candidate line-ups (for example, from a database not shown). Table 1 illustrates exemplary candidate line-ups. Channel matcher 154 of channel line-up processor 150 calculates a channel line-up from among the plurality of candidate line-ups that substantially matches the channels in the detected line-up, as indicated in step 532. Preferably, the substantial match is based upon the number of channels in a channel line-up matching the channels in the detected line-up. Furthermore levels of reception for the channels in the first line-up may be used to perform the substantial match all in accordance with the exemplary pseudo code:

/* Channel Matcher */
channel matcher (detected->, plurality->)
current matches=0

```
#matches=0
identifier=0
For each channel line-up in plurality->
current matches=0
select next channel line-up from plurality->
For each channel of detected->having a level of reception
    greater than threshold
    Compare channel to each channel of current channel
        line-up from plurality->and if a match then current
        matches++
EndFor
If current matches>#matches
    #matches=current matches
    identifier=current line-up identifier from plurality->en-
        dif
EndFor
return (identifier)
/*** END Channel Matcher END ***/
```

Step 534 illustrates the delivering as output the channel line-up calculated by channel matcher 154.

The embodiments of the invention described above are intended to be exemplary only. The scope of the invention is therefore intended to be limited solely by the scope of the appended claims.

We claim:

1. A system for localizing an EPG program schedule, comprising
    an EPG service provider station comprising:
        a database of channels and corresponding EPG program schedule information;
        a database manager identifying a plurality of channel line-ups potentially receivable at a viewing location;
        a transmitter; and
        a receiver;
    a multimedia viewer situated at the viewing location comprising:
        an automatic channel line-up identifier identifying a first line-up of television channels receivable at the viewing location;
        a channel line-up processor at the viewing location calculating a channel line-up from among the plurality of channel line-ups that substantially matches the first line-up;
        a receiver receiving from said EPG service provider station the plurality of channel line-ups; and
        a transmitter transmitting to said EPG service provider station the identifier of the channel line-up calculated by said channel line-up processor; and
    a network connection linking said multimedia viewer to said EPG service provider,
    wherein said EPG service provider station transmitter transmits to said multimedia viewer the plurality of channel line-ups and also transmits to said multimedia viewer EPG program schedule information localized to the viewing location and based on the identifier of the channel line-up calculated by said channel line-up processor, and wherein said EPG service provider station receiver receives from said multimedia viewer the identifier of the calculated channel line-up, and wherein said multimedia viewer receiver also receives from said EPG service provider station the EPG program schedule information.

2. The system of claim 1 wherein said automatic channel line-up identifier comprises:
    a television antenna receiving broadcast television signals at the viewing location;
    a television tuner adjusting channels until a channel having a significant level of channel reception at the viewing location is detected; and
    an autotune processor automatically stepping through a range of channels and using said television tuner to detect channels having significant levels of reception at the viewing location.

3. The system of claim 1 wherein said multimedia viewer further comprises a user interface enabling a user to input an indicator of a particular geographical location, and wherein the plurality of channel line-ups identified by said database manager are specific to the particular geographical location.

4. The system of claim 1 wherein said multimedia viewer further comprises a user interface enabling a user to input an indicator of a particular type of service, and wherein the plurality of channel line-ups identified by said database manager are specific to the particular type of service.

5. The system of claim 4 wherein the particular type of service is a cable program service.

6. The system of claim 4 wherein the particular type of service is a satellite broadcast service.

7. The system of claim 4 wherein the particular type of service is a television broadcast service.

8. The system of claim 4 wherein said user interface also enables a user to input an indicator of a particular service provider for the particular type of service, and wherein the plurality of channel line-ups identified by said database manager are specific to the particular service provider.

9. The system of claim 1 wherein said channel line-up processor finds a channel line-up from among the plurality of channel line-ups that has a maximal number of channels matching the channels in the first line-up.

10. The system of claim 1 wherein the substantial match is based upon levels of reception for the channels in the first line-up.

11. A system for localizing an EPG program schedule, comprising:
    a multimedia viewer situated at a viewing location comprising:
        an automatic channel line-up identifier identifying a first line-up of television channels receivable at the viewing location;
        a transmitter; and
        a receiver;
    an EPG service provider station comprising:
        a database of channels and corresponding EPG program schedule information;
        a database manager identifying a plurality of channel line-ups potentially receivable at the viewing location;
        a channel line-up processor for the EPG service provider calculating a channel line-up from among the plurality of channel line-ups that substantially matches the first line-up;
        a receiver receiving the first line-up from the viewing location; and
        a transmitter transmitting to the viewer location EPG program schedule information localized to the viewing location and based on the channel line-up calculated by said channel line-up processor; and
    a network connection linking said multimedia viewer to said EPG service provider,
    wherein said multimedia viewer transmitter transmits the first line-up to said EPG service provider station, and wherein said multimedia viewer receiver receives the EPG program schedule information from said EPG service provider station.

12. The system of claim 11 wherein said automatic channel line-up identifier comprises:
- a television antenna receiving broadcast television signals at the viewing location;
- a television tuner adjusting channels until a channel having a significant level of channel reception at the viewing location is detected; and
- an autotune processor automatically stepping through a range of channels and using said television tuner to detect channels having significant levels of reception at the viewing location.

13. The system of claim 11 wherein said multimedia viewer further comprises a user interface enabling a user to input an indicator of a particular geographical location, and wherein said multimedia viewer transmitter transmits the indicator of the particular geographical location to said EPG service provider station, and wherein said EPG service provider station receiver receives the indicator of the particular geographical location, and wherein the plurality of channel line-ups identified by said database manager are specific to the particular geographical location.

14. The system of claim 11 wherein said multimedia viewer further comprises a user interface enabling a user to input an indicator of a particular type of service, and wherein said multimedia viewer transmitter transmits the indicator of the particular type of service to said EPG service provider station, and wherein said EPG service provider station receiver receives the indicator of the particular type of service, and wherein the plurality of channel line-ups identified by said database manager are specific to the particular type of service.

15. The system of claim 14 wherein the particular type of service is a cable program service.

16. The system of claim 14 wherein the particular type of service is a satellite broadcast service.

17. The system of claim 14 wherein the particular type of service is a television broadcast service.

18. The system of claim 14 wherein said user interface also enables a user to input an indicator of a particular service provider for the particular type of service, and wherein said multimedia viewer transmitter transmits the indicator of the particular service provider to said EPG service provider station, and wherein said EPG service provider station receiver receives the indicator of the particular service provider, and wherein the plurality of channel line-ups identified by said database manager are specific to the particular service provider.

19. The system of claim 11 wherein said channel line-up processor finds a channel line-up from among the plurality of channel line-ups that has a maximal number of channels matching the channels in the first line-up.

20. The system of claim 11 wherein the substantial match is based upon levels of reception for the channels in the first line-up.

21. A system for localizing an EPG program schedule, comprising:
- an automatic channel line-up identifier identifying a first line-up of television channels receivable at a viewing location;
- a network connection connecting to an EPG service provider having a database of channels and corresponding EPG program schedule information;
- a receiver receiving from the EPG service provider a plurality of channel line-ups potentially receivable at the viewing location, each channel line-up including an identifier, and also receiving from the EPG service provider EPG program schedule information localized to the viewing location;
- a channel line-up processor calculating a channel line-up from among the plurality of channel line-ups that substantially matches the first line-up; and
- a transmitter transmitting the identifier of the calculated channel line-up to the EPG service provider, wherein the EPG program schedule information localized to the viewing location is based on the identifier of the channel line-up calculated by said channel line-up processor.

22. The system of claim 21 wherein said automatic channel line-up identifier comprises:
- a television antenna receiving broadcast television signals at the viewing location;
- a television tuner adjusting channels until a channel having a significant level of channel reception at the viewing location is detected; and
- an autotune processor automatically stepping through a range of channels and using said television tuner to detect channels having significant levels of reception at the viewing location.

23. The system of claim 21 further comprising a user interface enabling a user to input an indicator of a particular geographical location, and wherein the plurality of channel line-ups are specific to the particular geographical location.

24. The system of claim 21 further comprising a user interface enabling a user to input an indicator of a particular type of service, and wherein the plurality of channel line-ups are specific to the particular type of service.

25. The system of claim 24 wherein the particular type of service is a cable program service.

26. The system of claim 24 wherein the particular type of service is a satellite broadcast service.

27. The system of claim 24 wherein the particular type of service is a television broadcast service.

28. The system of claim 24 wherein the user interface also enables a user to input an indicator of a particular service provider for the particular type of service, and wherein the plurality of channel line-ups are specific to the particular service provider.

29. The system of claim 21 wherein said channel line-up processor finds a channel line-up from among the plurality of channel line-ups that has a maximal number of channels matching the channels in the first line-up.

30. The system of claim 21 wherein the substantial match is based upon levels of reception for the channels in the first line-up.

31. A system for localizing an EPG program schedule, comprising:
- a database of channels and corresponding EPG program schedule information;
- a network connection connecting to a viewing location;
- a receiver receiving from the viewer location a first line-up of television channels;
- a database manager identifying a plurality of channel line-ups potentially receivable at the viewing location;
- a channel line-up processor calculating a channel line-up from among the plurality of channel line-ups that substantially matches the first line-up; and
- a transmitter transmitting to the viewer location EPG program schedule information localized to the viewing location and based on the channel line-up calculated by said channel line-up processor.

32. The system of claim 31 wherein said receiver also receives an identifier of a particular geographical location, and wherein the plurality of channel line-ups are specific to the particular geographical location.

33. The system of claim 31 wherein said receiver also receives an identifier of a particular type of service, and wherein the plurality of channel line-ups are specific to the particular type of service.

34. The system of claim 33 wherein the particular type of service is a cable program service.

35. The system of claim 33 wherein the particular type of service is a satellite broadcast service.

36. The system of claim 33 wherein the particular type of service is a television broadcast service.

37. The system of claim 33 wherein said receiver also receives an identifier of a particular service provider for the particular type of service, and wherein the plurality of channel line-ups are specific to the particular service provider.

38. The system of claim 31 wherein said channel line-up processor finds a channel line-up from among the plurality of channel line-ups that has a maximal number of channels matching the channels in the first line-up.

39. The system of claim 31 wherein the substantial match is based upon levels of reception for the channels in the first line-up.

40. A method for localizing an EPG program schedule, comprising:
   automatically identifying a first line-up of television channels receivable at a viewing location;
   establishing a connection linking the viewing location to an EPG service provider through a network, the EPG service provider having a database of channels and corresponding EPG program schedule information;
   identifying a plurality of channel line-ups potentially receivable at the viewing location;
   transmitting to the viewer location the plurality of channel line-ups, each channel line-up including an identifier;
   receiving from the EPG service provider the plurality of channel line-ups;
   calculating a channel line-up from among the plurality of channel line-ups that substantially matches the first line-up;
   transmitting to the EPG server provider the identifier of the calculated channel line-up;
   receiving from the viewer location the identifier of the calculated channel line-up;
   transmitting to the viewer location EPG program schedule information localized to the viewing location, based on the identifier of the calculated channel line-up; and
   receiving from the EPG service provider the EPG program schedule information.

41. The method of claim 40 wherein said automatically identifying comprises:
   receiving broadcast television signals at the viewing location; and
   automatically stepping through a range of channels and detecting channels having significant levels of reception at the viewing location.

42. The method of claim 40 wherein the plurality of channel line-ups are specific to a particular geographical location.

43. The method of claim 40 wherein the plurality of channel line-ups are specific to a particular type of service.

44. The method of claim 43 wherein the particular type of service is a cable program service.

45. The method of claim 43 wherein the particular type of service is a satellite broadcast service.

46. The method of claim 43 wherein the particular type of service is a television broadcast service.

47. The method of claim 43 wherein the plurality of channel line-ups are specific to a particular service provider for the particular type of service.

48. The method of claim 40 wherein said calculating comprises finding a channel line-up from among the plurality of channel line-ups that has a maximal number of channels matching the channels in the first line-up.

49. The method of claim 40 wherein the substantial match is based upon levels of reception for the channels in the first line-up.

50. A method for localizing an EPG program schedule, comprising:
   automatically identifying a first line-up of television channels receivable at a viewing location;
   establishing a connection linking the viewing location to an EPG service provider through a network, the EPG service provider having a database of channels and corresponding EPG program schedule information;
   transmitting to the EPG service provider the first line-up;
   receiving from the viewer location the first line-up;
   identifying a plurality of channel line-ups potentially receivable at the viewing location;
   calculating a channel line-up from among the plurality of channel line-ups that substantially matches the first line-up;
   transmitting to the viewer location EPG program schedule information localized to the viewing location, based on the calculated channel line-up; and
   receiving from the EPG service provider the EPG program schedule information.

51. The method of claim 50 wherein said automatically identifying comprises:
   receiving broadcast television signals at the viewing location; and
   automatically stepping through a range of channels and detecting channels having significant levels of reception at the viewing location.

52. The method of claim 50 wherein the plurality of channel line-ups are specific to a particular geographical location.

53. The method of claim 50 wherein the plurality of channel line-ups are specific to a particular type of service.

54. The method of claim 53 wherein the particular type of service is a cable program service.

55. The method of claim 53 wherein the particular type of service is a satellite broadcast service.

56. The method of claim 53 wherein the particular type of service is a television broadcast service.

57. The method of claim 53 wherein the plurality of channel line-ups are specific to a particular service provider for the particular type of service.

58. The method of claim 50 wherein said calculating comprises finding a channel line-up from among the plurality of channel line-ups that has a maximal number of channels matching the channels in the first line-up.

59. The method of claim 50 wherein the substantial match is based upon levels of reception for the channels in the first line-up.

60. A method for localizing an EPG program schedule, comprising:
   automatically identifying a first line-up of television channels receivable at a viewing location;
   establishing a connection linking the viewing location to an EPG service provider through a network, the EPG service provider having a database of channels and corresponding EPG program schedule information;

receiving from the EPG service provider a plurality of channel line-ups potentially receivable at the viewing location, each channel line-up including an identifier;

calculating a channel line-up from among the plurality of channel line-ups that substantially matches the first line-up;

transmitting the identifier of the calculated channel line-up to the EPG service provide; and receiving from the EPG service provider EPG program schedule information localized to the viewing location, based on the identifier of the calculated channel line-up.

61. The method of claim 60 wherein said automatically identifying comprises:

receiving broadcast television signals at the viewing location; and automatically stepping through a range of channels and detecting channels having significant levels of reception at the viewing location.

62. The method of claim 60 wherein the plurality of channel line-ups are specific to a particular geographical location.

63. The method of claim 60 wherein the plurality of channel line-ups are specific to a particular type of service.

64. The method of claim 63 wherein the particular type of service is a cable program service.

65. The method of claim 63 wherein the particular type of service is a satellite broadcast service.

66. The method of claim 63 wherein the particular type of service is a television broadcast service.

67. The method of claim 63 wherein the plurality of channel line-ups are specific to a particular service provider for the particular type of service.

68. The method of claim 60 wherein said calculating comprises finding a channel line-up from among the plurality of channel line-ups that has a maximal number of channels matching the channels in the first line-up.

69. The method of claim 60 wherein the substantial match is based upon levels of reception for the channels in the first line-up.

70. A method for localizing an EPG program schedule, comprising:

receiving from a viewer location a first line-up of television channels;

identifying a plurality of channel line-ups potentially receivable at the viewing location;

calculating a channel line-up from among the plurality of channel line-ups that substantially matches the first line-up; and transmitting EPG program schedule information localized to the viewing location, based on the calculated channel line-up.

71. The method of claim 70 wherein the plurality of channel line-ups are specific to a particular geographical location.

72. The method of claim 70 wherein the plurality of channel line-ups are specific to a particular type of service.

73. The method of claim 72 wherein the particular type of service is a cable program service.

74. The method of claim 72 wherein the particular type of service is a satellite program service.

75. The method of claim 72 wherein the particular type of service is a television broadcast service.

76. The method of claim 72 wherein the plurality of channel line-ups are specific to a particular service provider for the particular type of service.

77. The method of claim 70 wherein said calculating comprises finding a channel line-up from among the plurality of channel line-ups that has a maximal number of channels matching the channels in the first line-up.

78. The method of claim 70 wherein the substantial match is based upon levels of reception for the channels in the first line-up.

79. A channel line-up processor, comprising:

a input interface receiving as input a detected line-up of television channels and a plurality of channel line-ups;

a channel matcher calculating a channel line-up from among the plurality of channel line-ups that substantially matches the channels in the detected line-up; and an output interface delivering as output the channel line-up calculated by said channel matcher.

80. The processor of claim 79 wherein the substantial match is based upon the number of channels in a channel line-up matching the channels in the detected line-up.

81. The processor of claim 79 wherein the substantial match is based upon levels of reception for the channels in the first line-up.

82. A method for processing channel line-ups, comprising:

receiving as input a detected line-up of television channels and a plurality of channel line-ups;

calculating a channel line-up from among the plurality of channel line-ups that substantially matches the channels in the detected line-up; and delivering as output the channel line-up calculated by said channel matcher.

83. The method of claim 82 wherein the substantial match is based upon the number of channels in a channel line-up matching the channels in the detected line-up.

84. The method of claim 82 wherein the substantial match is based upon levels of reception for the channels in the first line-up.

* * * * *